(12) United States Patent
Gopal et al.

(10) Patent No.: US 9,495,166 B2
(45) Date of Patent: *Nov. 15, 2016

(54) METHOD AND APPARATUS FOR PERFORMING A SHIFT AND EXCLUSIVE OR OPERATION IN A SINGLE INSTRUCTION

(71) Applicant: Intel Corporation, Santa Clara, CA (US)

(72) Inventors: Vinodh Gopal, Westborough, MA (US); James D. Guilford, Northborough, MA (US);
(Continued)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,360

(22) Filed: Dec. 1, 2014

(65) Prior Publication Data

US 2015/0089196 A1  Mar. 26, 2015

Related U.S. Application Data

(63) Continuation of application No. 12/653,704, filed on Dec. 17, 2009.

(51) Int. Cl.
  *G06F 7/00* (2006.01)
  *G06F 7/38* (2006.01)
  (Continued)

(52) U.S. Cl.
  CPC .......... *G06F 9/3816* (2013.01); *G06F 9/3001* (2013.01); *G06F 9/30029* (2013.01);
  (Continued)

(58) Field of Classification Search
  CPC .................. G06F 9/3816; G06F 9/3001; G06F 9/30029; G06F 9/30032; G06F 9/30036
  (Continued)

(56) References Cited

U.S. PATENT DOCUMENTS

| 3,781,819 A | 12/1973 | Geng et al. |
| 4,356,549 A | 10/1982 | Chueh |

(Continued)

FOREIGN PATENT DOCUMENTS

| CN | 101187861 | 5/2008 |
| JP | 08137666 | 5/1996 |

(Continued)

OTHER PUBLICATIONS

Kim, Sung Dae et al. "Novel Bit Manipulation Unit for Communication Digital Signal Processors," Proceedings ISCAS 2004, Vancouver, BC, IEEE 2004, 4 pages.*

(Continued)

*Primary Examiner* — Farley Abad
*Assistant Examiner* — Henry Yu
(74) *Attorney, Agent, or Firm* — Vecchia Patent Agent, LLC

(57) ABSTRACT

Method and apparatus for performing a shift and XOR operation. In one embodiment, an apparatus includes execution resources to execute a first instruction. In response to the first instruction, said execution resources perform a shift and XOR on at least one value.

27 Claims, 8 Drawing Sheets

(72) Inventors: Erdinc Ozturk, Marlborough, MA (US); Wajdi K. Feghali, Boston, MA (US); Gilbert M. Wolrich, Framingham, MA (US); Martin G. Dixon, Portland, OR (US)

(51) Int. Cl.
*G06F 1/02* (2006.01)
*G06F 17/50* (2006.01)
*G06F 9/38* (2006.01)
*G06F 9/30* (2006.01)

(52) U.S. Cl.
CPC ....... *G06F 9/30032* (2013.01); *G06F 9/30036* (2013.01); *G06F 9/30145* (2013.01); *G06F 9/30167* (2013.01); *G06F 9/3893* (2013.01)

(58) Field of Classification Search
USPC ....... 708/204, 209, 230, 236, 252, 270, 490, 708/525; 711/216; 716/101, 104; 712/210; 345/542
See application file for complete search history.

(56) References Cited

U.S. PATENT DOCUMENTS

| | | | |
|---|---|---|---|
| 4,467,444 | A | 8/1984 | Harmon et al. |
| 5,029,069 | A | 7/1991 | Sakamura |
| 5,504,914 | A | 4/1996 | Lai |
| 5,559,730 | A | 9/1996 | Marui et al. |
| 5,724,367 | A | 3/1998 | Osawa et al. |
| 5,864,344 | A | 1/1999 | Ikedo |
| 5,896,406 | A | 4/1999 | Berry et al. |
| 5,909,520 | A | 6/1999 | Garcia |
| 5,917,914 | A | 6/1999 | Shaw |
| 6,009,451 | A | 12/1999 | Burns |
| 6,134,597 | A | 10/2000 | Reith et al. |
| 6,223,320 | B1 | 4/2001 | Dubey et al. |
| 6,349,318 | B1 | 2/2002 | Vanstone et al. |
| 7,046,802 | B2 | 5/2006 | Rogaway |
| 7,114,116 | B2 | 9/2006 | Byrd |
| 7,395,294 | B1* | 7/2008 | Metzgen ............ 708/490 |
| 7,411,993 | B2 | 8/2008 | Sunaga et al. |
| 7,433,906 | B2* | 10/2008 | Ladyzhenskii .... H04B 1/70756 375/E1.014 |
| 7,472,149 | B2 | 12/2008 | Endo |
| 7,590,930 | B2 | 9/2009 | Kounavis |
| 7,653,674 | B2 | 1/2010 | Mitchell |
| 7,729,185 | B2 | 6/2010 | Shirur et al. |
| 7,885,989 | B2 | 2/2011 | Honda et al. |
| 7,886,255 | B2 | 2/2011 | Simar et al. |
| 7,895,251 | B2* | 2/2011 | Ishikawa ................ G06F 7/584 708/252 |
| 8,209,366 | B2 | 6/2012 | Dobbek et al. |
| 8,266,194 | B2 | 9/2012 | Kaluzhny |
| 2002/0152218 | A1 | 10/2002 | Moulton |
| 2004/0267858 | A1 | 12/2004 | Macy, Jr. et al. |
| 2006/0282743 | A1 | 12/2006 | Kounavis |
| 2007/0013704 | A1* | 1/2007 | MacWilliams et al. ...... 345/542 |
| 2008/0071851 | A1 | 3/2008 | Zohar et al. |
| 2008/0077773 | A1* | 3/2008 | Julier et al. ................... 712/210 |
| 2008/0177996 | A1 | 7/2008 | Simar et al. |
| 2008/0301134 | A1 | 12/2008 | Miller et al. |

FOREIGN PATENT DOCUMENTS

| | | |
|---|---|---|
| JP | 10-040078 A | 2/1998 |
| JP | 10512070 | 11/1998 |
| JP | 11511575 | 10/1999 |
| JP | 2004-135172 A | 4/2004 |
| JP | 2004-513592 A | 4/2004 |
| JP | 20040267858 | 4/2004 |
| JP | 2012-530978 A | 12/2012 |
| TW | 200302980 A | 8/2003 |
| TW | 200530920 A | 9/2005 |
| TW | I261968 B | 9/2006 |
| TW | 200915175 A | 4/2009 |
| WO | 9617291 | 6/1996 |
| WO | 9708608 | 3/1997 |
| WO | 02/41512 A1 | 5/2002 |
| WO | 2009/140142 A1 | 11/2009 |
| WO | 2011/084214 A2 | 7/2011 |
| WO | 2011/084214 A3 | 9/2011 |

OTHER PUBLICATIONS

International Search Report and Written Opinion of the International Search Authority for PCT/US2010/054754, Jun. 27, 2011, 9 pages.
International Preliminary Report on Patentability from the International Bureau for PCT/US2010/054754, Jun. 28, 2012, 5 pages.
Schroeppel, R. et al., Fast Key Exchange with Elliptic Curve Systems, Lecture Notes in Computer Science, vol. 963, 1995, 14 pages.
Grobschaedl, Johan et al. "When Instruction Set Extensions Change Algorithm Design: A Study in Elliptic Curve Cryptography," In Proceedings of the 4th Workshop on Application-Specific Processors (WASP 2005), pp. 2-9, Jersey City, NJ, USA, Sep. 22, 2005.
ARM Processor Instruction Set, ARM7500FD Data Sheet, ARM DDI 0077B, Dec. 21, 2009.
Snyder, Cary D., "Arm Family Expands at EPF," Microprocessor Report, Microdesign Resources, Jun. 3, 2002.
ARM Ltd., ARM Instruction Set Quick Reference Card, Oct. 1999, ARM QRC 0001D, ARM Ltd., Cambridge UK.
Dabholkar, et al., Efficient Implementation of Elliptic Curve Cryptography (ECC) for Personal Digital Assistants (PDAs), Wireless Personal Communications 29: pp. 233-246, 2004.
Sazeides, et al., Implementations of Context Based Value Predictors, ECE-97-8 Department of Electrical and Computer Engineering, University of Wisconsin-Madison, Dec. 1997, 19 pages.
Chormoviti, A. et al., Enhancing Embedded Processors with Specific Instruction Set Extensions for Network Applications, IEEE Workshop on Intelligent Data Acquisition and Advanced Computing Systems: Technology and Applications, Sep. 5-7, 2005, Sofia, Bulgaria, 5 pages.
Kim, Sung Dae et al., Novel Bit Manipulation Unit for Communication Digital Signal Processors, Poceedings ISCAS 2004, Vancouver, BC, IEEE 2004, 4 pages.
Office Action received for Korean Patent Application No. 10-2012-7012770, mailed on Jul. 19, 2013, 5 pages of English Translation and 5 pages of Korean Office Action.
Office Action received for German Patent Application No. 1120100048878, mailed on Nov. 11, 2014, 8 pages of English Translation and 8 pages of German Office Action.
Notice of Allowance received for U.S. Appl. No. 12/653,704, mailed on Sep. 26, 2014, 9 pages.
Non-Final Office Action received for U.S. Appl. No. 14/556,931, mailed on Mar. 26, 2015, 22 pages.
Non-Final Office Action received for U.S. Appl. No. 14/557,372, mailed on Mar. 27, 2015, 24 pages.
Office Action received for Chinese Patent Application No. 201010601696.5, mailed on Feb. 4, 2015, 11 pages of English Translation and 6 pages of Chinese Office Action.
Office Action received for Chinese Patent Application No. 201010601696.5, mailed on Aug. 4, 2014, 10 pages of English Translation and 7 pages of Chinese Office Action.
Office Action received for Chinese Patent Application No. 201010601696.5, mailed on Mar. 22, 2013, 9 pages of English Translation and 7 pages of Chinese Office Action.
Office Action received for Chinese Patent Application No. 201010601696.5, mailed on Nov. 25, 2013, 10 pages of English Translation and 7 pages of Chinese Office Action.
Office Action received for Japanese Patent Application No. 2012-516393, mailed on Jul. 2, 2013, 4 pages of English Translation and 4 pages of Japanese Office Action.
Office Action received for Japanese Patent Application No. 2012-516393, mailed on Jan. 28, 2014, 1 page of English Translation and 1 page of Japanese Office Action.

(56) References Cited

OTHER PUBLICATIONS

Office Action received for Japanese Patent Application No. 2014-092408, mailed on Feb. 3, 2014, 2 pages of English Translation and 1 page of Japanese Office Action.
Office Action received for Japanese Patent Application No. 2014-126121, mailed on Mar. 3, 2015, 9 pages of English Translation and 1 pages of Japanese Office Action.
Non-Final Office Action received for U.S. Appl. No. 12/653,704, mailed on Mar. 16, 2015, 17 pages.
Non-Final Office Action received for U.S. Appl. No. 12/653,704, mailed on Apr. 8, 2014, 16 pages.
Non-Final Office Action received for U.S. Appl. No. 12/653,704, mailed on Dec. 19, 2012, 11 pages.
Non-Final Office Action received for U.S. Appl. No. 12/653,704, mailed on Oct. 24, 2013, 14 pages.
Final Office Action received for U.S. Appl. No. 12/653,704, mailed on Jun. 4, 2013, 15 pages.
Office Action received for Taiwan Patent Application No. 099138315, mailed on Jun. 15, 2015, 7 pages of English Translation and 6 pages of Taiwan Office Action.
Final Office Action received for U.S. Appl. No. 12/653,704 mailed on Oct. 8, 2015, 20 pages.
Final Office Action received for U.S. Appl. No. 14/556,931, mailed on Oct. 8, 2015, 26 pages.
Final Office Action received for U.S. Appl. No. 14/557,372, mailed on Oct. 22, 2015, 28 pages.
ARM, "ARM Architecture Reference Manual", ARM® v7-A and Arm® v7-R edition, Apr. 5, 2007, pp. i-xxii, A4-9, A4-32,A5-5,A5-7-A5-8, A6-8-A6-15, A6-31, A7-12, A8-94-A8-99, A8-596-A8-597, B5-20, B6-26, C5-10, C5-12, AppxC-2, AppxG-4, AppxG-13, AppxH-12, AppxH-15, Appxi-13, AppxJ-4.
Office Action received for Japanese Patent Application No. 2014-092408, mailed on Aug. 25, 2015, 4 pages of English Translation and 3 pages of Japanese Office Action.
Office Action received for Japanese Patent Application No. 2014-126121, mailed on Aug. 25, 2015, 3 pages of English Translation and 3 pages of Japanese Office Action.
Office Action received for Chinese Patent Application No. 201010601696.5, mailed on Feb. 5, 2016, 15 pages (7 pages of English Translation and 8 pages of Office Action.
Office Action received for Taiwanese Patent Application No. 104117445, mailed on Feb. 19, 2016, 21 pages (14 pages of English Translation and 7 pages of Official Copy).
Notice of Allowance received for Japanese Patent Application No. 2014-126121, mailed on Mar. 22, 2016.
Notice of Allowance received for Taiwanese Patent Application No. 99138315, mailed on Jan. 19, 2016, 2 pages.
Notice of Allowance received for Japanese Patent Application No. 2014-092408 , mailed on Mar. 22, 2016.
Office Action received for Taiwanese Patent Application No. 104117444, mailed on May 9, 2016, 16 pages (8 pages of English translation and 8 pages of Official copy).
Office Action received for Taiwanese Patent Application No. 104117447, mailed on May 9, 2016, 18 pages (9 pages of English Translation and 9 pages of Official Copy).
Non Final Office Action received for U.S. Appl. No. 12/653,704, mailed on Jul. 5, 2016, 20 pages.
Notice of Allowance received for U.S. Appl. No. 14/556,931, mailed on Jun. 29, 2016, 9 pages.
Notice of Allowance received for U.S. Appl. No. 14/557,372, mailed on Jul. 1, 2016, 11 pages.

\* cited by examiner

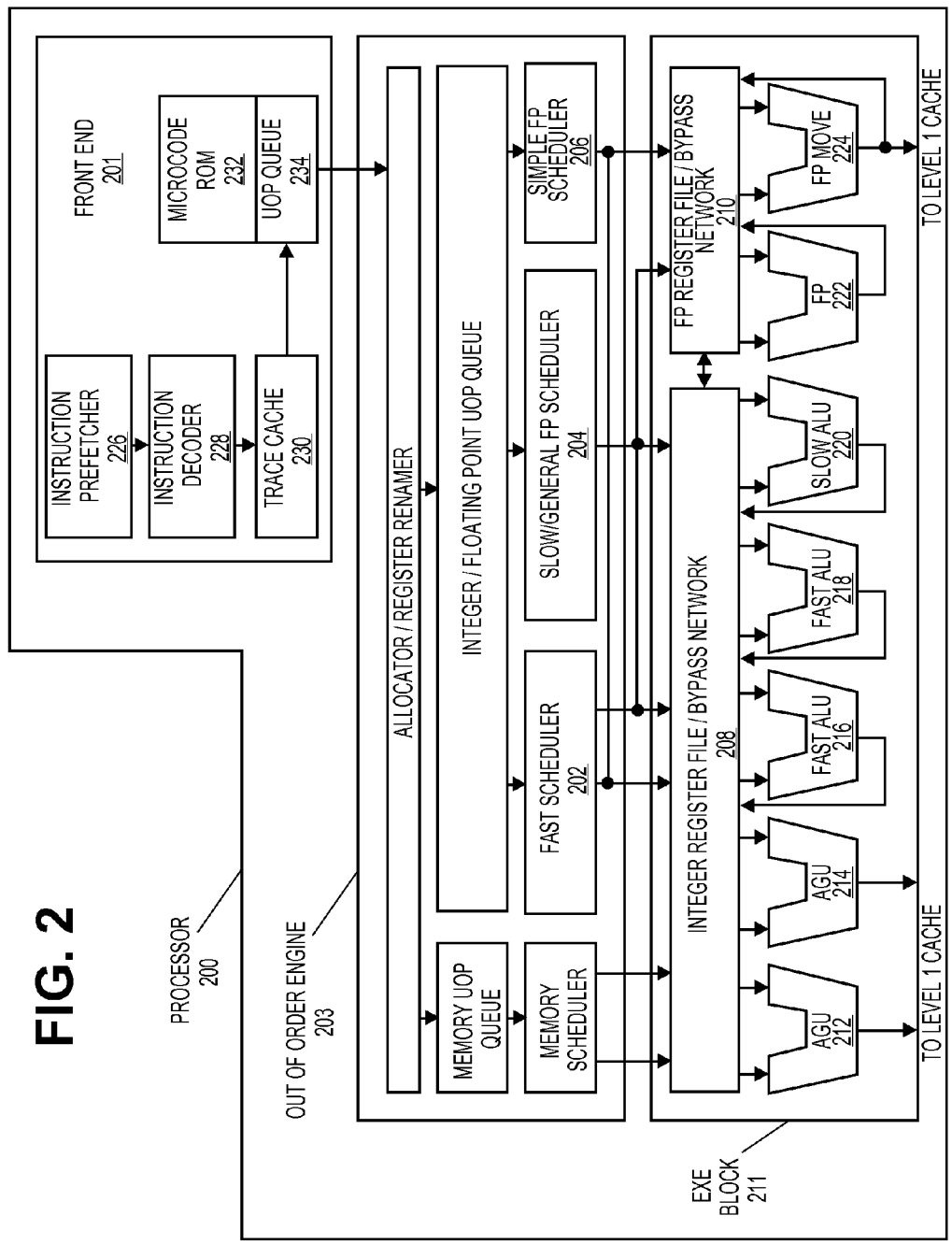

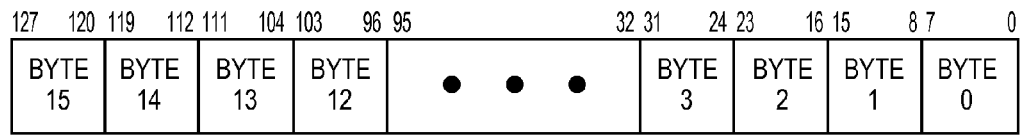
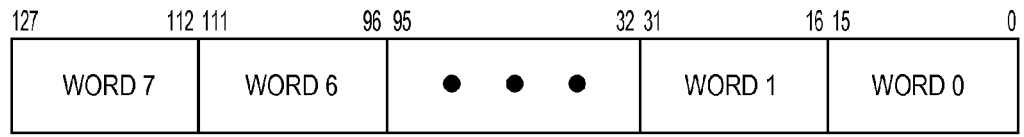
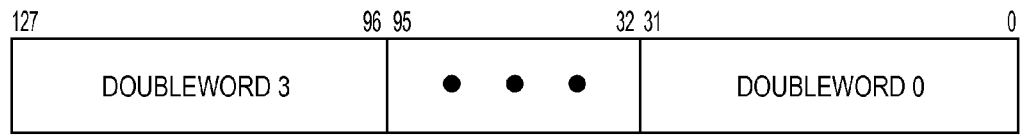
FIG. 3A
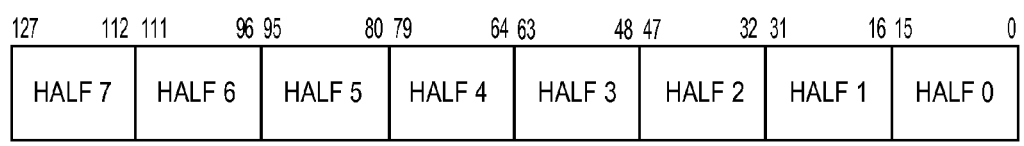
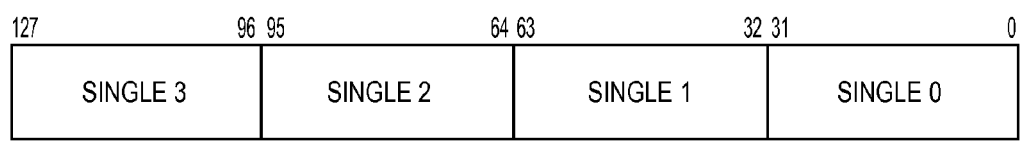
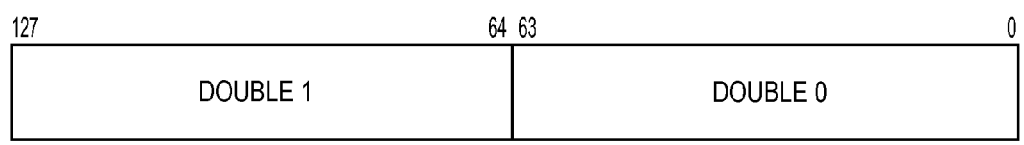
FIG. 3B

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | • • • | | bbbb bbbb | bbbb bbbb | bbbb bbbb | |

UNSIGNED PACKED BYTE REPRESENTATION 344

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • • • | | sbbb bbbb | sbbb bbbb | sbbb bbbb | |

SIGNED PACKED BYTE REPRESENTATION 345

| 127 | 112 111 | | 16 15 | 0 |
|---|---|---|---|---|
| wwww wwww wwww wwww | • • • | | wwww wwww wwww wwww | |

UNSIGNED PACKED WORD REPRESENTATION 346

| 127 | 112 111 | | 16 15 | 0 |
|---|---|---|---|---|
| swww wwww wwww wwww | • • • | | swww wwww wwww wwww | |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

UNSIGNED PACKED DOUBLEWORD REPRENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

SIGNED PACKED DOUBLEWORD REPRESENTATION 349

FIG. 3C

METHOD AND APPARATUS FOR PERFORMING A SHIFT AND EXCLUSIVE OR OPERATION IN A SINGLE INSTRUCTION

RELATED APPLICATIONS

This is a Continuation of application Ser. No. 12/653,704, filed Dec. 17, 2009, currently pending.

FIELD OF THE INVENTION

The present disclosure pertains to the field of computer processing. More particularly, embodiments relate to an instruction to perform a shift and exclusive OR (XOR) operation.

DESCRIPTION OF RELATED ART

Single-instruction-multiple data (SIMD) instructions are useful in various applications for processing numerous data elements (packed data) in parallel. Performing operations, such as a shift operation and an exclusive OR (XOR) operation, in series can decrease performance.

BRIEF DESCRIPTION OF THE FIGURES

The present invention is illustrated by way of example and not limitation in the Figures of the accompanying drawings:

FIG. 2 is a block diagram of the micro-architecture for a processor of one embodiment that includes logic circuits to perform a shift and XOR operation in accordance with the present invention;

FIG. 3A illustrates various packed data type representations in multimedia registers according to one embodiment of the present invention;

FIG. 3B illustrates packed data-types in accordance with an alternative embodiment;

FIG. 3C illustrates various signed and unsigned packed data type representations in multimedia registers according to one embodiment of the present invention;

DETAILED DESCRIPTION

Figure 1A:
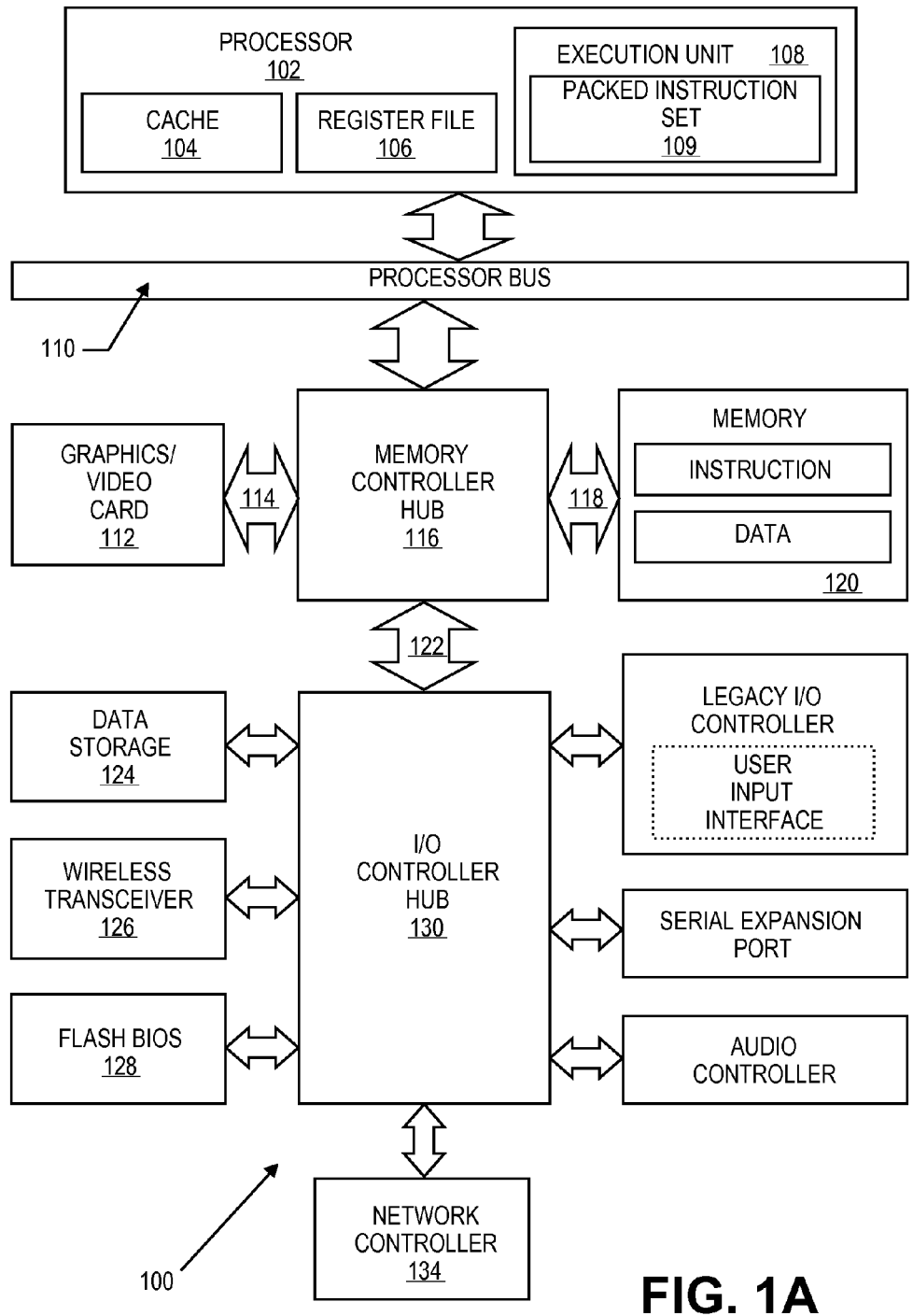
FIG. 1A is a block diagram of a computer system formed with a processor that includes execution units to execute an instruction for a shift and XOR operation in accordance with one embodiment of the present invention.

The following description describes embodiments of a technique to perform a shift and XOR operation within a processing apparatus, computer system, or software program. In the following description, numerous specific details such as processor types, micro-architectural conditions, events, enablement mechanisms, and the like are set forth in order to provide a more thorough understanding of the present invention. It will be appreciated, however, by one skilled in the art that embodiments of the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, embodiments of the present invention is not limited to processors or machines that perform 256 bit, 128 bit, 64 bit, 32 bit, or 16 bit data operations and can be applied to any processor and machine in which manipulation of packed data is needed.

Although the below examples describe instruction handling and distribution in the context of execution units and logic circuits, other embodiments of the present invention can be accomplished by way of software stored on tangible medium. In one embodiment, the methods of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like. Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

A design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task, which in turn can reduce the power consumption. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Presently a SIMD shift and XOR instruction is not available. Without the presence of a SIMD shift and XOR instruction, according to embodiments of the invention, a large number of instructions and data registers may be needed to accomplish the same results in applications such as audio/video/graphics compression, processing, and manipulation. Thus, at least one shift and XOR instruction in accordance with embodiments of the present invention can reduce code overhead and resource requirements. Embodiments of the present invention provide a way to implement a shift and XOR operation as an algorithm that makes use of SIMD related hardware. Presently, it is somewhat difficult and tedious to perform shift and XOR operations on data in a SIMD register. Some algorithms require more instructions to arrange data for arithmetic operations than the actual number of instructions to execute those operations. By implementing embodiments of a shift and XOR operation in accordance with embodiments of the present invention, the number of instructions needed to achieve shift and XOR processing can be drastically reduced.

Embodiments of the present invention involve an instruction for implementing a shift and XOR operation. In one embodiment, a shift and XOR operation . . . .

A shift and XOR operation according to one embodiment as applied to data elements can be generically represented as:

DEST1←F SRC1[SRC2];

In one embodiment, SRC1 stores a first operand having a plurality of data elements and SRC2 contains a value representing the value to be shifted by the shift and XOR instruction. In other embodiments, the shift and XOR value indicator may be stored in an immediate field.

In the above flow, "DEST" and "SRC" are generic terms to represent the source and destination of the corresponding data or operation. In some embodiments, they may be implemented by registers, memory, or other storage areas having other names or functions than those depicted. For example, in one embodiment, DEST1 and DEST2 may be a first and second temporary storage area (e.g., "TEMP1" and "TEMP2" register), SRC1 and SRC3 may be first and second destination storage area (e.g., "DEST1" and "DEST2" register), and so forth. In other embodiments, two or more of the SRC and DEST storage areas may correspond to different data storage elements within the same storage area (e.g., a SIMD register).

FIG. 1A is a block diagram of an exemplary computer system formed with a processor that includes execution units to execute an instruction for a shift and XOR operation in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention is not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs.

Embedded applications can include a micro controller, a digital signal processor (DSP), system on a chip, network computers (NetPC), set-top boxes, network hubs, wide area network (WAN) switches, or any other system that performs shift and XOR operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to perform an algorithm to shift and XOR a number of data elements in accordance with one embodiment of the present invention. One embodiment may be described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed shift and XOR instruction for performing a shift and XOR on a number of operands. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute an algorithm with a shift and XOR instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
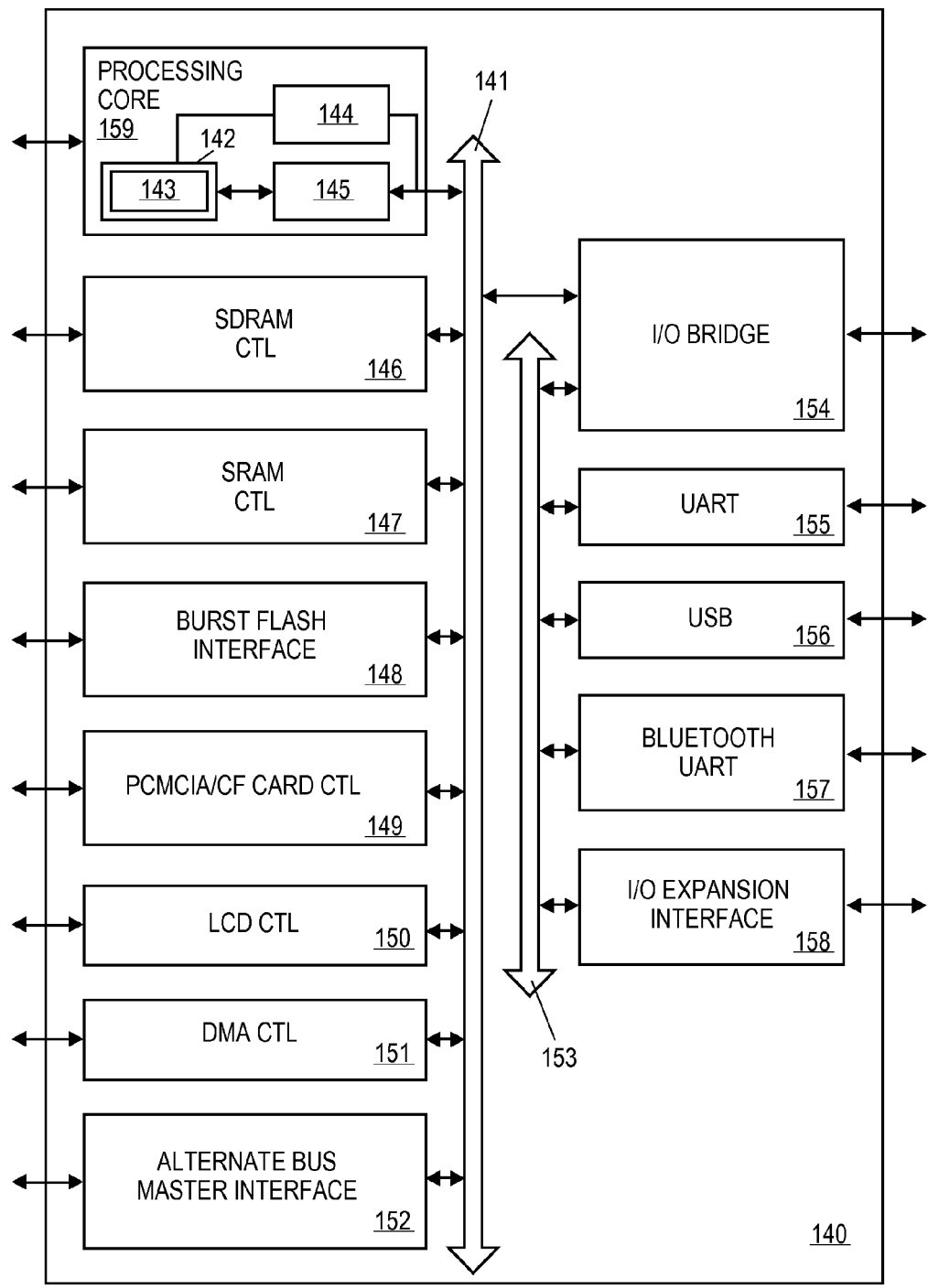
FIG. 1B is a block diagram of another exemplary computer system in accordance with an alternative embodiment of the present invention.

FIG. 1B illustrates a data processing system 140 which implements the principles of one embodiment of the present invention. It will be readily appreciated by one of skill in the art that the embodiments described herein can be used with alternative processing systems without departure from the scope of the invention.

Computer system 140 comprises a processing core 159 capable of performing SIMD operations including a shift and XOR operation. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting shift and XOR operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a shift and XOR operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM). Some embodiments of the invention may also be applied to graphics applications, such as three dimensional ("3D") modeling, rendering, objects collision detection, 3D objects transformation and lighting, etc.

Figure 1C:
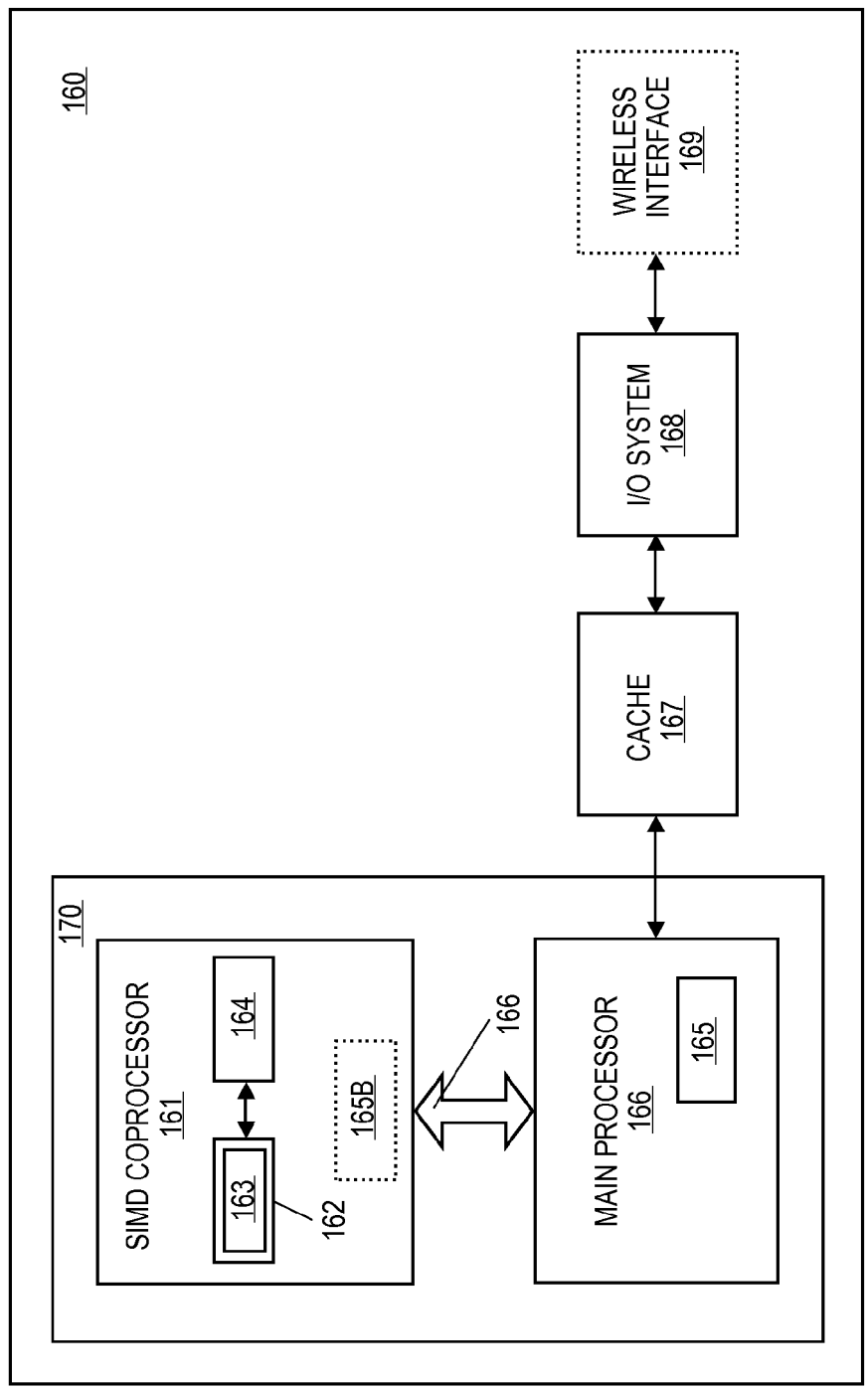
FIG. 1C is a block diagram of yet another exemplary computer system in accordance with another alternative embodiment of the present invention.

FIG. 1C illustrates yet alternative embodiments of a data processing system capable of performing SIMD shift and XOR operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including shift and XOR operations. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including SIMD shift and XOR calculation instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD shift and XOR instructions.

FIG. 2 is a block diagram of the micro-architecture for a processor 200 that includes logic circuits to perform a shift and XOR instruction in accordance with one embodiment of the present invention. For one embodiment of the shift and XOR instruction, the instruction can shift a floating point mantissa value to the right by the amount indicated by the exponent, XOR the shifted value by a value, and produce the final result. In one embodiment the in-order front end 201 is the part of the processor 200 that fetches macro-instructions to be executed and prepares them to be used later in the processor pipeline. The front end 201 may include several units. In one embodiment, the instruction prefetcher 226 fetches macro-instructions from memory and feeds them to an instruction decoder 228 which in turn decodes them into primitives called micro-instructions or micro-operations (also called micro op or uops) that the machine can execute. In one embodiment, the trace cache 230 takes decoded uops and assembles them into program ordered sequences or traces in the uop queue 234 for execution. When the trace cache 230 encounters a complex macro-instruction, the microcode ROM 232 provides the uops needed to complete the operation.

Many macro-instructions are converted into a single micro-op, whereas others need several micro-ops to complete the full operation. In one embodiment, if more than four micro-ops are needed to complete a macro-instruction, the decoder 228 accesses the microcode ROM 232 to do the macro-instruction. For one embodiment, a packed shift and XOR instruction can be decoded into a small number of micro ops for processing at the instruction decoder 228. In another embodiment, an instruction for a packed shift and XOR algorithm can be stored within the microcode ROM 232 should a number of micro-ops be needed to accomplish the operation. The trace cache 230 refers to a entry point programmable logic array (PLA) to determine a correct micro-instruction pointer for reading the micro-code sequences for the shift and XOR algorithm in the microcode ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of this embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 216, 218. The fast ALUs 216, 218, of this embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains sixteen XMM and general purpose registers, eight multimedia (e.g., "EM64T" additions) multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operated with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In this embodiment, in storing packed data and integer data, the registers do not need to differentiate between the two data types. In one embodiment, other registers or combination of registers may be used to store 256 bits or more data.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
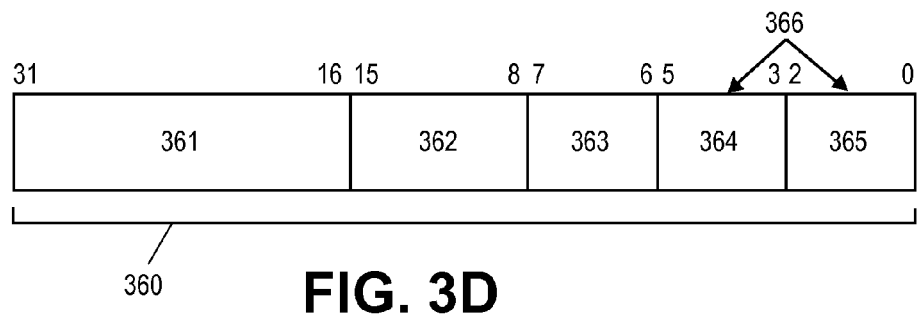
FIG. 3D illustrates one embodiment of an operation encoding (opcode) format.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, a shift and XOR operation may be encoded by one or more of fields 361 and 362. Up to two operand locations per instruction may be identified, including up to two source operand identifiers 364 and 365. For one embodiment of the shift and XOR instruction, destination operand identifier 366 is the same as source operand identifier 364, whereas in other embodiments they are different. For an alternative embodiment, destination operand identifier 366 is the same as source operand identifier 365, whereas in other embodiments they are different. In one embodiment of a shift and XOR instruction, one of the source operands identified by source operand identifiers 364 and 365 is overwritten by the results of the shift and XOR operations, whereas in other embodiments identifier 364 corresponds to a source register element and identifier 365 corresponds to a destination register element. For one embodiment of the shift and XOR instruction, operand identifiers 364 and 365 may be used to identify 32-bit or 64-bit source and destination operands.

Figure 3E:
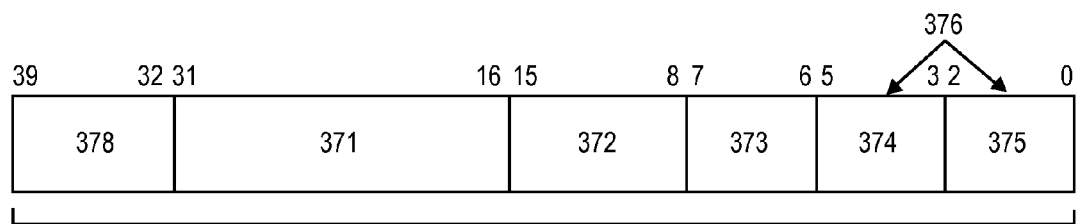
FIG. 3E illustrates an alternative operation encoding (opcode) format.

FIG. 3E is a depiction of another alternative operation encoding (opcode) format 370, having forty or more bits. Opcode format 370 corresponds with opcode format 360 and comprises an optional prefix byte 378. The type of shift and XOR operation may be encoded by one or more of fields 378, 371, and 372. Up to two operand locations per instruction may be identified by source operand identifiers 374 and 375 and by prefix byte 378. For one embodiment of the shift and XOR instruction, prefix byte 378 may be used to identify 32-bit or 64-bit source and destination operands. For one embodiment of the shift and XOR instruction, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, the shift and XOR operations shift and XOR one of the operands identified by operand identifiers 374 and 375 to another operand identified by the operand identifiers 374 and 375 is overwritten by the results of the shift and XOR operations, whereas in other embodiments the shift and XOR of the operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
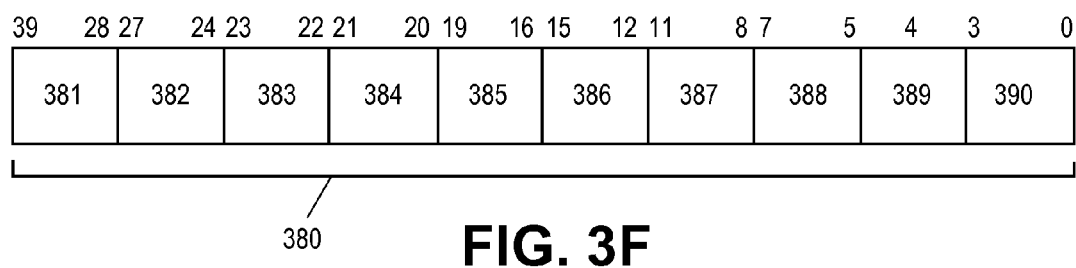
FIG. 3F illustrates yet another alternative operation encoding format.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments of shift and XOR operations, may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, the shift and XOR operation is performed on floating point data elements. In some embodiments, a shift and XOR instruction may be executed conditionally, using selection field 381. For some shift and XOR instructions source data sizes may be encoded by field 383. In some embodiments of shift and XOR instruction, Zero (Z), negative (N), carry (C), and overflow (V) detection can be done on SIMD fields. For some instructions, the type of saturation may be encoded by field 384.

Figure 4:
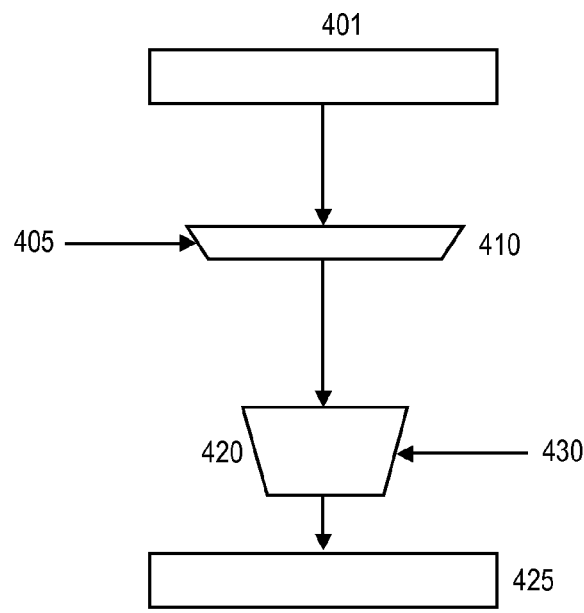
FIG. 4 is a block diagram of one embodiment of logic to perform an instruction in accordance with the present invention.

FIG. 4 is a block diagram of one embodiment of logic to perform a shift and XOR operation on packed data operands in accordance with the present invention. Embodiments of the present invention can be implemented to function with various types of operands such as those described above. For simplicity, the following discussions and examples below are in the context of a shift and XOR instruction to process data elements. In one embodiment, a first operand 401 is shifted by shifter 410 by an amount specified by input 405. In one embodiment it is a right shift. However in other embodiments the shifter performs a left shift operation. In some embodiments the operand is a scalar value, whereas in other embodiments it is a packed data value having a number of different possible data sizes and types (e.g., floating point, integer). In one embodiment, the shift count 405 is a packed (or "vector") value, each element of which corresponds to an element of a packed operand to be shifted by the corresponding shift count element. In other embodiments, the shift count applies to all elements of the first data operand. Furthermore, in some embodiments, the shift count is specified by a field in the instruction, such as an immediate, r/m, or other field. In other embodiments, the shift count is specified by a register indicated by the instruction.

The shifted operand is then XOR'ed by a value 430 by logic 420 and the XOR'ed result is stored in a destination storage location (e.g., register) 425. In one embodiment, the XOR value 430 is a packed (or "vector") value, each element of which corresponds to an element of a packed operand to be XOR'ed by the corresponding XOR element. In other embodiments, the XOR value 430 applies to all elements of the first data operand. Furthermore, in some embodiments, the XOR value is specified by a field in the instruction, such as an immediate, r/m, or other field. In other embodiments, the XOR value is specified by a register indicated by the instruction.

Figure 5:
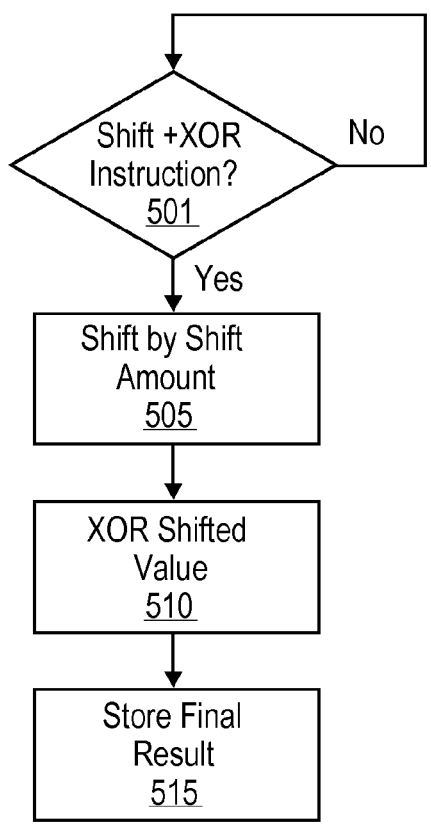
FIG. 5 is a flow diagram of operations to be performed in conjunction with one embodiment.

FIG. 5 illustrates the operation of a shift and XOR instruction according to one embodiment of the present invention. At operation 501, if a shift and XOR instruction is received, a first operand is shifted by a shift count at operation 505. In one embodiment it is a right shift. However in other embodiments the shifter performs a left shift operation. In some embodiments the operand is a scalar value, whereas in other embodiments it is a packed data value having a number of different possible data sizes and types (e.g., floating point, integer). In one embodiment, the shift count 405 is a packed (or "vector") value, each element of which corresponds to an element of a packed operand to be shifted by the corresponding shift count element. In other embodiments, the shift count applies to all elements of the first data operand. Furthermore, in some embodiments, the shift count is specified by a field in the instruction, such as an immediate, r/m, or other field. In other embodiments, the shift count is specified by a register indicated by the instruction.

At operation 510, the shifted value is XOR'ed by an XOR value. In one embodiment, the XOR value 430 is a packed (or "vector") value, each element of which corresponds to an element of a packed operand to be XOR'ed by the corresponding XOR element. In other embodiments, the XOR value 430 applies to all elements of the first data operand. Furthermore, in some embodiments, the XOR value is specified by a field in the instruction, such as an immediate, r/m, or other field. In other embodiments, the XOR value is specified by a register indicated by the instruction.

At operation 515, the shifted and XOR'ed value is stored in a location. In one embodiment, the location is a scalar register. In another embodiment, the location is a packed data register. In another embodiment, the destination location is also used as a source location, such as a packed data register specified by the instruction. In other embodiments the destination location is a different location than the source locations storing the initial operand or other values, such as the shift count or the XOR value.

In one embodiment, the shift and XOR instruction is useful for performing data de-duplication in various computer applications. Data de-duplication attempts to find common blocks of data between files in order to optimize disk storage and/or network bandwidth. In one embodiment, a shift and XOR instruction is useful for improving performance in data de-duplication operations using operations, such as finding chunk boundaries using a rolling hash, hash digest (e.g., SHA1 or MD5) and compression of unique chunks (using fast Lempel-Ziv schemes).

For example, one data de-duplication algorithm can be illustrated by the following pseudo-code:

```
while (p < max) {
    v = (v >> 1) XOR scramble[(unsigned char)*p];
    if v has at least z trailing zeros {
        ret = 1;
        break;  }
    p++;
}
```

In the above algorithm, a scramble table is a 256-entry array of random 32-bit constants and v is the rolling hash that has a hash-value of the past 32 bytes of the data. When a chunk boundary is found, the algorithm returns with ret=1 and the position, p, denotes the boundary of the chunk. The value z can be a constant such as 12-15 that results in good chunk detection and can be application specific. In one embodiment, the shift and XOR instruction can help the above algorithm operate at rate of about 2 cycles/byte. In other embodiments, the shift and XOR instruction helps the algorithm to perform even faster or slower, depending on the use.

At least one embodiment, in which the shift and XOR instruction is used can be illustrated by the following pseudo-code:

```
while (p < max) {
    v = (v << 1) XOR brefl_scramble[(unsigned char)*p];
    if v has at least z leading zeros {
        ret = 1;
        break; }
    p++;
}
```

In the above algorithm, each entry of the brefl_scramble array contains the bit-reflected version of the corresponding entry in the original scramble array. In one embodiment, the above algorithm shifts v left instead of right and v contains a bit-reflected version of the rolling-hash. In one embodiment, the check for a chunk boundary is performed by checking a minimum number of leading zeros.

In other embodiments, the shift and XOR instruction may be used in other useful computer operations and algorithms. Furthermore, embodiments help to improve the performance of many programs that use shift and XOR operations extensively.

Thus, techniques for performing a shift and XOR instruction are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
a display control;
a memory interface; and
a processor, the processor comprising:
  a plurality of levels of cache including a Level 1 (L1) cache;
  a plurality of integer registers;
  a plurality of floating-point registers in which to store floating-point data elements including 128-bit packed double operands that are to have two 64-bit double floating-point data elements;
  a plurality of status registers;
  an instruction pointer register;
  an instruction prefetcher to fetch instructions;
  a decoder to decode the fetched instructions including an instruction to perform a shift and exclusive OR (XOR) operation, wherein the instruction to perform the shift and XOR operation has a first source operand identifier to identify a first source operand, a second source operand identifier to identify a second source operand, an immediate field to specify a shift amount, and a field to identify the first and second source operands as being one of 32-bit source operands and 64-bit source operands; and
  an execution unit coupled to the decoder, the processor, in response to the instruction to perform the shift and XOR operation, is to:
    shift the first source operand by the shift amount that is to be specified by the immediate field, wherein the first source operand is to include all data to be shifted in response to the instruction, and wherein the first source operand is a scalar value,
    XOR the shifted first source operand with the second source operand, and
    store a resulting shifted and XOR'ed value in a destination register, wherein the destination register is a scalar register; and
  a floating-point unit to operate on floating-point data elements.

2. The system of claim 1, wherein the processor, in response to the instruction, is to right shift the first source operand by the shift amount.

3. The system of claim 1, wherein the processor, in response to the instruction, is to left shift the first source operand by the shift amount, and wherein the processor further comprises a reorder buffer.

4. The system of claim 1, wherein the processor, in response to the instruction, is to logically shift the first source operand by the shift amount.

5. The system of claim 1, wherein the processor, in response to the instruction, is to arithmetically shift the first source operand by the shift amount.

6. The system of claim 1, wherein the instruction is to have one or more fields to encode a type of the shift and XOR operation.

7. The system of claim 1, wherein the floating-point unit is to execute a 64-bit by 64-bit floating-point divide.

8. The system of claim 1, wherein the processor has a reduced instruction set computing (RISC) architecture, and wherein the processor further comprises a reorder buffer.

9. The system of claim 1, wherein the processor further comprises a reorder buffer.

10. The system of claim 9, wherein the reorder buffer is to reorder micro-operations to be performed by the execution unit.

11. The system of claim 1, wherein said all data to be shifted in response to the instruction is to be stored in a single register.

12. The system of claim 1, wherein the first source operand is to be a 64-bit operand, and wherein the execution unit, in response to the instruction, is to shift 64-bits of data.

13. The system of claim 1, wherein the processor, in response to the instruction, is not to shift the second source operand.

14. A system comprising:
a display control;
a memory interface; and
a processor, the processor comprising:
  a plurality of levels of cache including a Level 1 (L1) cache;
  a plurality of integer registers;
  a plurality of floating-point registers in which to store floating-point data elements including 128-bit packed double operands that are to have two 64-bit double floating-point data elements;
  a plurality of status registers;
  an instruction pointer register;
  an instruction prefetcher to fetch instructions;
  a decoder to decode the fetched instructions including an instruction to perform a shift and exclusive OR (XOR) operation, wherein the instruction to perform the shift and XOR operation has a first source operand identifier to identify a first source operand, a second source operand identifier to identify a second source operand, an immediate field to specify a shift amount, and a field to identify the first and second source operands as being one of 32-bit source operands and 64-bit source operands; and an execution unit coupled to the decoder, the processor, in response to the instruction to perform the shift and XOR operation, is to:

shift the first source operand by the shift amount that is to be specified by the immediate field without shifting the second source operand, wherein the first source operand is a scalar value, XOR the shifted first source operand with the second source operand, and store a resulting shifted and XOR'ed value in a destination register, wherein the destination register is a scalar register; and a floating-point unit to operate on floating-point data elements.

15. The system of claim 14, wherein the processor comprises a general-purpose processor, and wherein the processor, in response to the instruction, is to left shift the first source operand by the shift amount.

16. The system of claim 14, wherein the processor further comprises a reorder buffer, and wherein the processor, in response to the instruction, is to logically shift the first source operand by the shift amount.

17. The system of claim 14, wherein the processor, in response to the instruction, is to arithmetically shift the first source operand by the shift amount.

18. The system of claim 14, wherein the instruction is to have one or more fields to encode a type of the shift and XOR operation, and wherein the processor has a reduced instruction set computing (RISC) architecture.

19. A system comprising:
a display control;
a memory interface; and
a processor, the processor comprising:
a plurality of levels of cache including a Level 1 (L1) cache;
a plurality of integer registers;
a plurality of floating-point registers in which to store floating-point data elements including 128-bit packed double operands that are to have two 64-bit double floating-point data elements;
a plurality of status registers;
an instruction pointer register;
an instruction prefetcher to fetch instructions;
a decoder to decode the fetched instructions including an instruction to perform a shift and exclusive OR (XOR) operation, wherein the instruction to perform the shift and XOR operation has a first source operand identifier to identify a first source operand, a second source operand identifier to identify a second source operand, an immediate field to specify a shift amount, and a field to identify the first and second source operands as being one of 32-bit source operands and 64-bit source operands; and
an execution unit coupled to the decoder, the processor, in response to the instruction to perform the shift and XOR operation, is to:
shift the first source operand by the shift amount that is to be specified by the immediate field, wherein the first source operand is a scalar value,
XOR the shifted first source operand with the second source operand, wherein the XOR is to be performed on independent data values, and
store a resulting shifted and XOR'ed value in a destination register, wherein the destination register is a scalar register; and a floating-point unit to operate on floating-point data elements.

20. The system of claim 19, wherein the processor further comprises a reorder buffer, wherein the processor, in response to the instruction, is to left shift the first source operand by the shift amount, and wherein the instruction is to have one or more fields to encode a type of the shift and XOR operation.

21. The system of claim 14, wherein the first source operand is to include all data to be shifted in response to the instruction, wherein the processor comprises a general-purpose processor, wherein the shift is a left shift, and wherein the processor further comprises a reorder buffer.

22. The system of claim 19, wherein the first source operand is to include all data to be shifted in response to the instruction, wherein the processor comprises a general-purpose processor, wherein the shift is an arithmetic shift, and wherein the processor further comprises a reorder buffer.

23. A system comprising:
a display control;
a memory interface; and
a processor coupled to the RAM and the wireless transceiver, the processor comprising:
a plurality of levels of cache including a Level 1 (L1) cache;
a plurality of integer registers;
a plurality of registers in which to store floating-point data elements including 128-bit packed double operands that are to have two 64-bit double floating-point data elements;
a plurality of status registers;
an instruction pointer register;
an instruction prefetcher to fetch instructions;
a decoder to decode the fetched instructions including an instruction to perform a shift and exclusive OR (XOR) operation, wherein the instruction to perform the shift and XOR operation has a first source operand identifier to identify a first 64-bit source operand, a second source operand identifier to identify a second 64-bit source operand, an immediate field to specify a shift amount, and a field to identify the first and second 64-bit source operands as being 64-bit source operands; and
an execution unit coupled to the decoder, the processor, in response to the instruction to perform the shift and XOR operation, is to:
shift the first 64-bit source operand arithmetically by the shift amount that is to be specified by the immediate field in a 64-bit shift operation wherein the first 64-bit source operand is to include all data to be shifted in response to the instruction, wherein the first source operand is a scalar value,
XOR the arithmetically shifted 64-bit first source operand with the second 64-bit source operand, and
store a resulting shifted and XOR'ed value in a destination register, wherein the destination register is a scalar register; and
a floating-point unit to operate on floating-point data elements.

24. The system of claim 23, wherein the instruction is to have one or more fields to encode a type of the shift and XOR operation, and wherein the processor has a reduced instruction set computing (RISC) architecture.

25. The system of claim 23, wherein the processor, in response to the instruction, is to perform the XOR on the arithmetically shifted 64-bit first source operand with the 64-bit second source operand which are allowed to be independent data values.

26. A system comprising:
a display control;
a memory interface; and
a processor coupled to the RAM and the wireless transceiver, wherein the processor is a general-purpose processor, and wherein the processor has a reduced instruction set computing (RISC) architecture, the processor comprising:
  a plurality of levels of cache including a Level 1 (L1) cache;
  a plurality of integer registers;
  a reorder buffer;
  a plurality of registers in which to store floating-point data elements including 128-bit packed double operands that are to have two 64-bit double floating-point data elements;
  a plurality of status registers;
  an instruction pointer register;
  an instruction prefetcher to fetch instructions;
  a decoder to decode the fetched instructions including an instruction to perform a shift and exclusive OR (XOR) operation, wherein the instruction to perform the shift and XOR operation has a first source operand identifier to identify a first 64-bit source operand, a second source operand identifier to identify a second 64-bit source operand, an immediate field to specify a shift amount, and a field to identify the first and second source operands as being 64-bit source operands; and
  an execution unit coupled to the decoder, the processor, in response to the instruction to perform the shift and XOR operation, is to:
    shift the first 64-bit source operand arithmetically by the shift amount that is to be specified by the immediate field in a 64-bit shift operation, wherein the first source operand is to include all data to be shifted in response to the instruction, and wherein the first source operand is a scalar value,
    XOR the arithmetically shifted first 64-bit source operand with the second 64-bit source operand, and
    store a resulting shifted and XOR'ed value in a destination register, wherein the destination register is a scalar register; and
  a floating-point unit to operate on floating-point data elements.

27. The system of claim 26, wherein the instruction is to have one or more fields to encode a type of the shift and XOR operation.

* * * * *